(12) United States Patent
Davis et al.

(10) Patent No.: US 8,572,438 B2
(45) Date of Patent: Oct. 29, 2013

(54) N-WAY RUNTIME INTEROPERATIVE DEBUGGING

(75) Inventors: Jackson M. Davis, Bothell, WA (US); Gregg Bernard Miskelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 13/167,729

(22) Filed: Jun. 24, 2011

(65) Prior Publication Data

US 2012/0331351 A1    Dec. 27, 2012

(51) Int. Cl.
*G06F 11/00* (2006.01)
(52) U.S. Cl.
USPC ........................................................ 714/38.1
(58) Field of Classification Search
USPC ........................................................ 714/38.1
See application file for complete search history.

(56) References Cited

U.S. PATENT DOCUMENTS

| | | | |
|---|---|---|---|
| 5,410,648 A | 4/1995 | Pazel | |
| 5,781,778 A | 7/1998 | Meier et al. | |
| 5,815,653 A | 9/1998 | You et al. | |
| 6,412,106 B1 * | 6/2002 | Leask et al. | 717/124 |
| 6,516,460 B1 | 2/2003 | Merks et al. | |
| 6,988,264 B2 | 1/2006 | Sarma et al. | |
| 7,353,498 B2 * | 4/2008 | Gupta et al. | 717/125 |
| 2004/0168155 A1 * | 8/2004 | O'Farrell et al. | 717/129 |
| 2006/0294432 A1 | 12/2006 | Thelen | |
| 2007/0288939 A1 | 12/2007 | Stall | |
| 2008/0141222 A1 | 6/2008 | Alpern | |
| 2009/0282390 A1 | 11/2009 | Geselowitz | |
| 2010/0242026 A1 | 9/2010 | Bates et al. | |

FOREIGN PATENT DOCUMENTS

WO    2006000943 A2    1/2006

OTHER PUBLICATIONS

"CLR Debugging Overview", Retrieved at <<http://msdn.microsoft.com/en-us/library/bb397953.aspx>>, Retrieved Date : Apr. 1, 2011, pp. 9.
"Debugging", Retrieved at <<http://www.atollic.com/index.php/truestudio/debugging>>, Retrieved Date : Apr. 1, 2011, pp. 4.
"Advanced Debugging Techniques", Retrieved at <<http://etutorials.org/Programming/Mastering+visual+studio+.net/Chapter+3.+Debugging/3.5+Advanced+Debugging+Techniques/>>,Retrieved Date : Apr. 1, 2011, pp. 4.
Chaudhuri, et al., "Debugging in Visual Studio .NET", Retrieved at <<http://msdn.microsoft.com/en-us/library/aa290350(v=vs.71).aspx>>,Retrieved Date : Apr. 1, 2011, pp. 6.

(Continued)

*Primary Examiner* — Bryce Bonzo (57) ABSTRACT

Simultaneous debugging of code running in multiple types of runtime environment can be performed by an n-way interoperative debugging environment. Code running within a particular runtime can be debugged simultaneously with a code running within other runtimes within a single process. Out-of-process debugging support is provided for inspection and execution control. A compatible debugger or runtime communication protocol is used. Transitions from one runtime to another runtime can be detected. Exceptions thrown in one runtime can be caught by another runtime. Stepping operations can occur in multiple runtimes. A callstack including frames from multiple runtimes can be walked.

20 Claims, 6 Drawing Sheets

(56) References Cited

OTHER PUBLICATIONS

Borger, et al., "A Generic and Reflective Debugging Architecture to Support Runtime Visibility and Traceability of Aspects", Retrieved at <<https://lirias.kuleuven.be/bitstream/123456789/222697/1/paper.pdf>>,Proceedings of the 8th ACM international conference on Aspect-oriented software development, 2009, pp. 12.

"International Search Report", Mailed Date: Nov. 30, 2012, Application No. PCT/US2012/041040, Filed Date: Jun. 6, 2012, pp. 09.

* cited by examiner

N-WAY RUNTIME INTEROPERATIVE DEBUGGING

BACKGROUND

When a process is being debugged, debug events can be generated. A debugger typically listens and responds to the debug events. Debug events can be created when a process is created, when a module is loaded, when an exception is thrown, when a breakpoint is encountered and so on. A debugger uses the debug events and inspection application programming interfaces (APIs) to implement debugging operations. When a debug event is dispatched, the debuggee (the process being debugged) is typically stopped until the debugger continues the debug event. While the debuggee is stopped, the debugger can inspect the state of the debuggee. When the debuggee is continued, the process runs until the next debug event is encountered. Typically, managed code and native code debugging have different sets of debug events and different ways of transitioning between stopped and running states.

Native debugging is typically implemented by the operating system (OS). The OS provides the debugging API for listening to and continuing debug events. When a debug event occurs, the OS freezes the debuggee (the process being debugged). Native debugging is an out-of-process operation, that is, the process is frozen and code outside the process (in the OS) inspects values from the frozen process. Out-of-process debugging does not need cooperation from the debuggee. The native debuggee stop state is called frozen because the process has been stopped by the OS and no code executes inside the process until the OS starts the process up again.

Debugging in a virtual machine environment (e.g., in Eclipse or in Microsoft's Visual Studio®) is not performed by the operating system on a frozen process. Debugging in a virtual machine environment is typically implemented by the runtime environment of the virtual machine and is an in-process operation. Code inside the process executes to perform the debugging operations. The OS has no knowledge of when this type of debugging is occurring. The debuggee stop state is sometimes referred to as "synchronized" because a synchronized process is live from the OS perspective, but all the threads are stopped by the runtime environment. Virtual machine debug events may be "built on top of" or implemented using native debug events.

Virtual machine runtime services implement virtual machine debugging operations and do not implement native debug operations. Similarly, native debugging APIs do not provide support for debugging in a virtual machine environment. Debug operations in a virtual machine environment and native debug operations are implemented differently. For example, in Visual Studio®, managed stepping is implemented via a runtime environment API while native stepping is implemented via a native debug library that consumes native debug events. Native execution control (control of stepping operations and breakpoints) is typically implemented using OS exception processing and lacks explicit support in the native debugging API. The managed debugging API explicitly has breakpoint and stepping functionality. The difference in the abstraction levels of managed and native debugging prevents code sharing between managed and native debugging operations.

Some IDEs are able to debug code running in a virtual machine runtime environment and in a native runtime in a single debug session. This is called interoperative debugging. The mechanisms used in known interoperative debuggers are limited and rely on a tedious and fragile cooperation between the native and virtual machine runtime debuggers because of the underlying conflicting debugging architecture designs.

SUMMARY

Simultaneously within the same debug session, debugging of code running within multiple types of runtime environments within a single debuggee process can be performed using an extensible debug architecture. Such simultaneous debugging is referred to herein as n-way interoperative debugging. N-way interoperative debugging can provide a holistic view of the entire debuggee process including a logical view of all of the runtime environments executing in the single debuggee process (in a single debug session). Interactions between runtime debuggers can also be viewed. The debugging support for a virtual machine runtime environment enables interoperative debugging using a set of debugger interfaces to facilitate debugging operations. Debugging support created by the virtual machine runtime environment does not interfere with debugging other runtime debuggees in the process.

Interoperative debugging enables execution control, stepping a debuggee code running from one runtime into another, setting breakpoints in multiple runtime debuggees, inspecting values from multiple runtime debuggees and executing callstacks that contain code from multiple runtime debuggers. Runtime debuggers are prioritized so the highest priority runtime debugger controls execution and unwinds the stack.

Conforming runtime debuggees can be interoperatively debugged by the n-way interoperative debugger. A conforming runtime debuggee is one that uses out-of-process debugging support for inspection and execution control, uses a compatible debugger/debuggee communication protocol, can detect boundaries into and out of a runtime debuggee for execution control and stack unwinding. For those runtime debuggees that throw exceptions, compatible runtime debuggers can detect exceptions thrown from one runtime debuggee and caught within another runtime debuggee. Out-of-process debugging does not involve executing code in the debuggee process so that the runtimes do not interfere with each other's threading model or execution model. Conforming runtime debuggers can be plugged into the n-way interoperative debugger.

The interfaces and mechanisms described herein can be used as a general extensibility model for stepping operations in a debugger.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In accordance with aspects of the subject matter disclosed herein, a runtime debugger architecture that can interoperatively debug with any compatible runtime debugger in the process is described. Code running on n-way interoperative compatible runtime debuggees can be debugged using an out-of-process operation. Core debugger operations including but not limited to data inspection, execution control, and stack unwinding can be performed from outside the debuggee process using OS primitives that do not require executing code within the debuggee process. Executing code in the runtime debuggee process is avoided in part because executing code in the runtime debuggee process could generate more debug events when the process was stopped, as well as for other reasons. Out-of-process debugging ensures that multiple runtime debuggees will not interfere with each other's threading model at debug time. It also ensures that inspecting a runtime within the debuggee process will not cause side effects that other runtime debuggers cannot handle.

Read/write process memory primitives allow the debugger to read/write memory into the debuggee process. Get and set thread context primitives enable the access and modification of the register set in the debuggee process. Debugger primitives that are written on top of the OS primitives include breakpoints and single step instruction. A single step operation tells the processor to execute a single instruction and then stop and notify the debugger. The debug API can notify the debugger of a set of events that happen in the debuggee process including process create and destroy, module load and unload, breakpoint hit, single step finished, exception occurred. Notification from the communication channel is also done using an out-of-process model so that when a breakpoint is hit a notification is sent to the debugger without running code in the debuggee process.

A compatible protocol between the debuggee process and the out-of-process debugger is used for n-way interoperative debugging compatible runtimes. That is, a runtime debugger notifies a debugger that a debug event has occurred in the debuggee process in a way that does not cause other runtime debuggers to malfunction or to be unable to communicate. One n-way interoperative debug compatible protocol that can be used is the Win32® debug event model created by Microsoft Corporation.

Boundaries between n-way interoperative compatible runtime debuggees in the process are identifiable when a runtime debugger controls a debug operation. For example, if code running on Runtime Debugger A calls into code running on Runtime Debugger B, Runtime Debugger B can detect that control has transitioned into Runtime Debugger B and can take control of the debug operation.

N-way interoperative debug compatible runtime debuggers that support an exception model are able to identify when an exception is being caught by its runtime debugger. Exceptions can originate in one runtime debugger and be caught in another. For example, suppose code running on Runtime Debuggee A calls into code running on Runtime Debuggee B, and a user is stepping through code running on Runtime Debuggee B. If an exception is thrown while the step operation is occurring, that exception may get caught by Runtime Debuggee A. In this case, the debugger step operation can be suspended at that point. When a runtime debugger detects when an exception is caught by its runtime debuggee, a handler found notification can be generated. Exceptions from one runtime debuggee can be used as the implementation of exceptions for another runtime debugged. For example, exceptions thrown within the Common Language Runtime (CLR) are actually native Structured Exception Handler exceptions. Thus, the native debugger is unaware that a step is complete when an exception is thrown and caught until after the CLR's debugger can inspect the handler block. Compatible debuggees do not have to use an exception model for indicating errors.

N-way Interoperative Debugging

Figure 1:
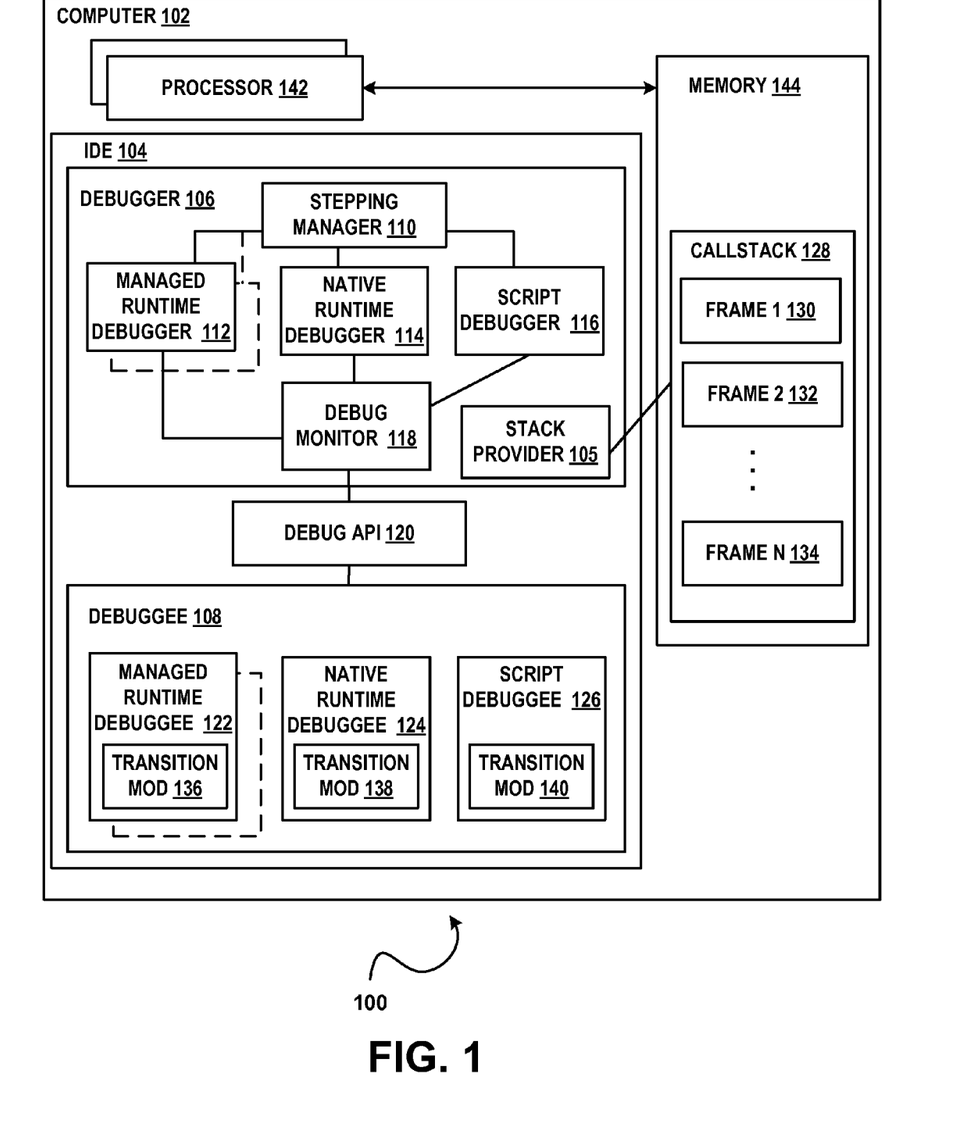
FIG. 1 illustrates an example of a system 100 that n-way interoperative debugging in accordance with aspects of the subject matter disclosed herein.

FIG. 1 illustrates an example of a system 100 for n-way runtime interoperative debugging in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 may execute wholly or partially within an IDE such as IDE 104 or can execute wholly or partially outside an IDE. IDE 104 can be an IDE such as the one described with respect to FIG. 4 or can be any other IDE. All or portions of system 100 may be implemented as a plug-in or add-on.

System 100 may include one or more computing devices or computers such as a computer 102 comprising: one or more processors such as processor 142, etc., a memory such as memory 144, an n-way interoperative debugger such as debugger 106, a debuggee 108, and a set of debug APIs 120. Debugger 106 can include one or more modules including one or more modules comprising a stepping manager 110 and a debug monitor 118. In accordance with aspects of the subject matter disclosed herein a developer debugging program code executing in the debuggee process can debug the multiple runtimes simultaneously using debugger 106. The developer can step from code running in one runtime debuggee to code running in another debugee runtime. Breakpoints can be set in any, some or all of the runtime debuggees executing in the debuggee process. Debuggee values (e.g., values of variables, etc.) can be inspected in one runtime debuggee while another runtime is being viewed. A callstack associated with the debugger 106 can include code from multiple runtimes. Debugger 106 can include one or more of: a native runtime debugger 114, an interpreter debugger 116, a stack provider 117 and one or more managed runtime debuggers 112, etc. Debugger 106 can also include a stack provider 117. Debugger 106 can be extensible so that one or more n-way interoperative compatible debuggers can be plugged into debugger 106.

A debuggee 108 can include some or all of: one or more managed runtime debuggees 122, etc., a native runtime debuggee 124 and an interpreter debuggee 126. An instance of a module can be loaded into the debuggee process that is marked as a transition module by a runtime (e.g., transition module 136 in managed runtime debuggee 122, transition module 138 in native runtime debuggee 124, transition module 140 in interpreter debuggee 126). Other components well known in the arts may also be included but are not here shown. It will be appreciated that one or more of the above can be loaded into memory 144 to cause one or more processors such as processor 142 to perform the actions attributed to the one or more modules which together perform n-way interoperative debugging as described more fully below.

Stepping manager 110 can comprise a module or class that provides a communication channel between runtime debuggers such as managed runtime debugger 112, etc. native runtime debugger 114 and interpreter debugger 116. Stepping manager 110 can implement stepping arbitration, described more fully below. Stepping manager 110 can include a module that receives a single step request that stores state about the step including the type of step (step-over, step-in, step-out), the unit of the step (statement, line, or instruction) and the starting frame base and address. A debug monitor such as debug monitor 118 can comprise a module or class that manages the communication channel between the debugger (e.g., debugger 106) and the debuggee (e.g., debuggee 108). Debug monitor 118 can route debug events to a corresponding debugger. For example, events generated in managed runtime debuggee 122 can be routed by debug monitor 118 to managed runtime debugger 112, events generated in native runtime debuggee 124 can be routed by managed runtime debugger 112 to native runtime debugger 114, events generated in interpreter 126 can be routed by debug monitor 118 to interpreter debugger 116 and so on. The debug monitor 118 can comprise a module or class that implements the debug event loop (e.g., the Win32 debug event loop). The debug monitor 118 can comprise a debug monitor module or class that can translate debug events from the debugger process runtimes into debug events compatible with the debug APIs 120.

An n-way interoperative debugger 106 can receive a request from a callstack window to start walking callstack frames such as frame 1 130, frame 2 132 . . . frame n 134 of callstack 128. The n-way interoperative debugger 106 can route the call to the stack provider 105. The stack provider 105 can ask each runtime debugger (e.g., managed runtime debugger 112, etc., native runtime debugger 114, interpreter runtime debugger 116) if the runtime debugger owns the current location, that is if the instruction currently being executed is in a range of frames belonging to that runtime debugger. The runtime debuggers are asked in order of priority. When a runtime debugger claims the location in the callstack 128, frames are requested from the callstack 128 by the claiming runtime (the current controlling runtime debugger) and are processed by the claiming runtime debugger until the claiming runtime debugger detects a frame that does not belong to it. Runtime debuggers are prioritized because one runtime debugger can be implemented on top of another runtime debugger. The priority order of runtime debuggers is useful because it is possible for higher level runtime debuggers such as interpreters to be implemented using another runtime such as a managed or native runtime debugger. For example, in the case of an interpreter runtime debugger implemented in managed code, the interpreter runtime debugger can be given a chance to unwind the frame before the managed runtime debugger. Suppose Runtime Debugger A is implemented on top of Runtime Debugger B. Runtime Debugger A can take priority over Runtime Debugger B to ensure that the higher level runtime debugger, Runtime Debugger A, is able to perform execution control and can unwind the stack. For example, suppose an interpreter runtime debugger is implemented in managed code. In this case, the interpreter runtime debugger has priority over the managed code runtime debugger. Ultimately, all code is native, so the native execution engine and stack unwinder can be the lowest priority runtime.

Each of the runtime debuggers in an n-way interoperative debugger such as debugger 106 represents a single instance of a runtime debugger debugging a particular runtime in a debuggee process. Examples of different types of runtime debuggers that can execute in debugger 106 include a native runtime debugger instance, a virtual machine runtime debugger instance and an interpreter runtime debugger instance. Each runtime debugger instance is responsible for understanding and implementing debugging of a particular runtime debuggee. That is, a managed runtime debugger 112 debugs code running within the managed runtime, a native runtime debugger 114 debugs code running on the native runtime within a debuggee process and so on.

System 100 can provide out-of-process debugging support for inspection and execution control. Out-of-process debugging is used because although managed runtime environments can implement debugging support within the debuggee process, doing so introduces incompatibilities between runtimes. For example, an in-process debugger runs the debugger code within the debuggee process. Out-of-process debuggers such as native debuggers will not allow the debuggee thread to run while the debugger is in break-mode. Because an in-process debugger can chose from any of a large number of possible threading models, defining compatible models that enable n-way interoperative debugging for any in-process debugger is an intractable problem. Therefore, the out-of-process debugger model is implemented in system 100.

One example of a runtime that conforms to the "out-of-process" debugger model is Microsoft's native win32 runtime. Debuggers designed to debug native code running on the win32 operating system use a combination of the pdb (program database) file, a file that holds debugging and project state information, the win32 debugging APIs, and features on the hardware to perform various debugger tasks such as stepping, or examining variable state. For example, to examine a local variable on the stack in a native application, the native runtime debugger first looks up the information about that variable in the pdb. The information in the pdb includes the type of the variable, how it is formatted in memory, and where in memory the variable resides. The debugger uses out-of-process read memory APIs to obtain the bytes for the variable from the debuggee process. It can then format the value as described in the pdb and display the formatted information to the user. Another example of an out-of-process operation is stepping a native win32 application. To perform a step operation, the native debugger can look up the debuggee's current instruction pointer in the pdb to obtain a source line to memory range mapping. It can use primitives such as single-step and breakpoint instructions to cause the debuggee process to execute until the end of the source range is encountered.

Runtimes that need more dynamic interactions between the runtime and the debugger such as interpreters or virtual machine runtime environments can expose data structures at well-known locations to allow the corresponding debugger to read the data structures using out-of-process read memory APIs at debug time. A corresponding runtime debugger can read from and write to the data structures to affect runtime behavior. For example, to set a breakpoint on an interpreter source line, the debugger can locate the breakpoints data structure and write information to the data structure to enable the breakpoint. The runtime debuggee can trigger the breakpoint when execution reaches the breakpoint. Stepping can be implemented similarly. For example, the debugger can write the step information into a data structure defining the thread. The interpreter can stop when the step is complete. Information about a thread's stack can be made available for data inspection operations via out-of-process read memory APIs. The debugger can select the correct stack frame, match it with the correct stack frame object in the debuggee using out-of-process read memory, and use the data structure to obtain the names, values, and types of the variables on the stack frame.

A just-in-time (JIT) based runtime can expose data structures in ways that the debugger can access them using out-of-process APIs. Data structures can be abstracted into higher level objects that reside in the debugger process. The debugger can consume the objects using read and write process memory. Execution control operations such as stepping and breakpoints can be implemented using the same hardware primitives native code would use (single step and hardware breakpoints). Actual mapping from source line to instruction address can be based on the output of the JIT compiler and therefore can be dynamic. Actual mapping (and stepping ranges) can be obtained by reading data structures out of the process.

An n-way interoperative compatible debuggable runtime has to have a way to communicate debug events to the debugger. To support n-way interop, the protocol must be compatible with the other runtime debuggers debugging the process. One way to ensure compatibility is to implement a protocol that works with the out-of-process model and does not cause event confusion between the various runtime debuggers. Some runtime debugger architectures use a higher level protocol such as named pipes for this purpose, but such protocols often violate the out-of-process model. Hence in accordance with aspects of the subject matter discloser herein, a native debug pipeline such as but not limited to the win32 debug pipeline is implemented. Functions including a WaitForDebugEvent function and a ContinueDebugEvent function can be used to allow the debugger to receive notifications about what is happening in the process and to continue execution of the debuggee when it has finished processing a debug event. Debug events include a create process event, a create thread event, a load module event and exceptions. A hit breakpoint event and a complete single step event can be implemented on top of exceptions using specific exception codes. To enable multiple runtime debuggers to receive the events through the debug APIs, an n-way interoperative debug architecture can separate out the debug event loop from the actual runtime debugger implementations, as described more fully below.

To implement execution control in an n-way interoperative debugger (i.e., interoperative execution control), in accordance with aspects of the subject matter disclosed herein, transitions into and out of a runtime have to be detectable because a runtime debugger that begins a step operation may not be the runtime debugger that finishes the step operation. For example, during a step-in operation, if a call instruction is encountered, the call may be made to code running within another runtime debuggee in the process. The runtime debugger that is currently in control of the operation ("the current controlling runtime debugger") has to be able to relinquish control and let another runtime debugger take over control. Detection of a transition into another runtime debuggee can be implemented in various ways including but not limited to those described below.

The runtime debuggee may use a standard module (i.e., a transition module) for the entry point. That is, any time a step operation causes the debuggee's instruction pointer to land within a transition module, a possible transition into another runtime debuggee has been encountered. In response the current controlling runtime debugger can stop stepping, and give the other runtime debuggers a chance to finish the step. If no new controlling runtime debugger is encountered, the original runtime debugger can complete the step. The process of allowing other runtime debuggers to inspect the current instruction pointer and take control is called "Stepping Arbitration" herein.

The runtime debuggee may have well known functions that are called at runtime transition points, enabling the runtime debuggee to set breakpoints at these functions. When these breakpoints are hit during a stepping operation, the runtime debugger for that runtime can request that the previous controlling runtime debugger give up control of the operation.

An interpreter or other tightly controlled runtime debuggee including but not limited to the CLR may be able to fire a debug event into the debugger at the transition point. If a step operation is occurring, that runtime debuggee's debugger can request that the former runtime debugger give up control of the operation. When unwinding the callstack, the runtime's unwinder can be aware of the regions in the callstack, where code running on the runtime exists. This ensures the correct runtime unwinder is called for a particular region of the callstack. Because one runtime debugger can be implemented on top of another runtime debugger, the higher level runtime debugger can be given priority to prevent the lower level runtime debugger from unwinding the wrong section of the callstack.

Finally, an n-way interoperative debugger compatible runtime debuggee has to be able to detect when an exception has been caught by a handler in the runtime debuggee even if the exception was originally thrown from another runtime debuggee. At least some runtime debuggees have some kind of error handling. When an error occurs in one runtime environment and it transitions to another runtime environment, if it is possible for the runtime to stop the process and handle the error condition, it can stop execution control. Runtime debuggees that do not support exceptions do not have to detect caught exceptions. Being able to detect a caught exception allows a step operation to complete when a handler is found even if the exception crosses runtime debuggee boundaries. Some runtime debuggers have to initiate arbitration when their handler found notification is fired because their exception model is implemented on top of another runtime debuggee's exception model.

Figure 2A:
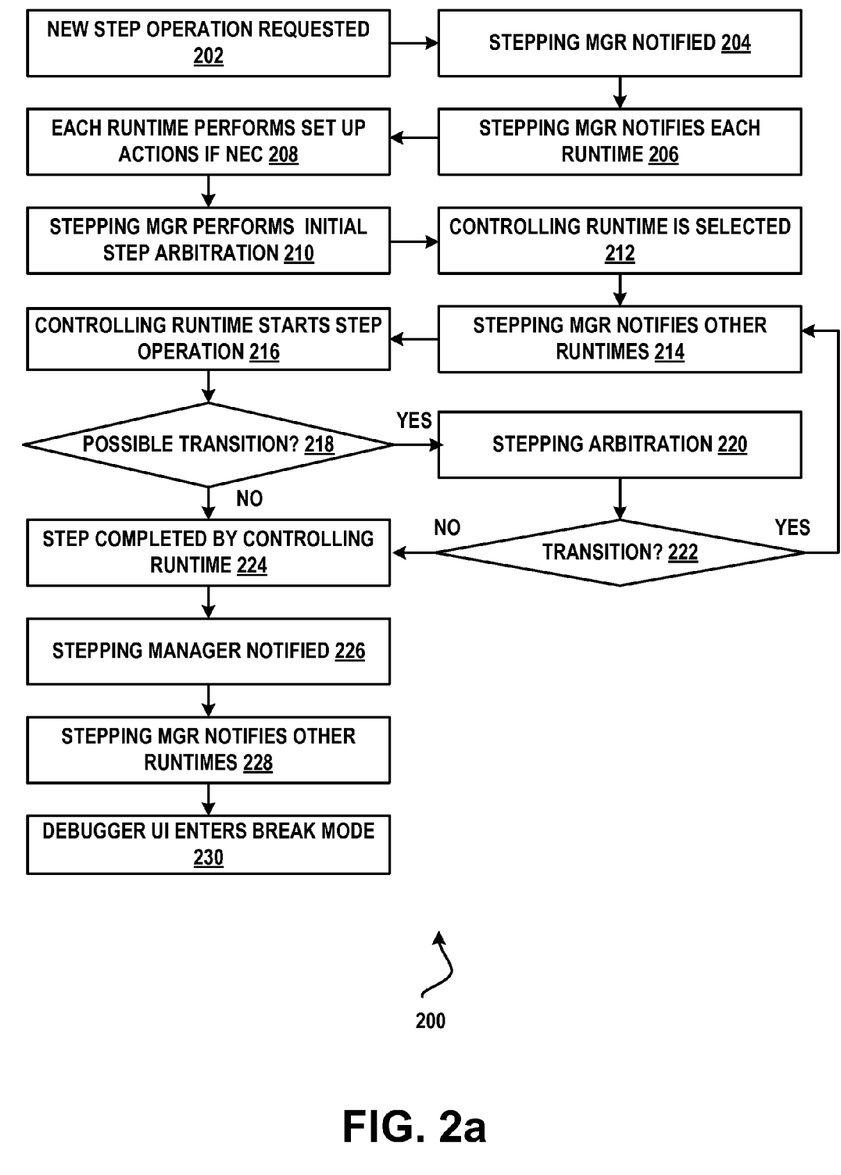
FIG. 2a is a flow diagram of an example of a method 200 for n-way interopoperative debugging in accordance with aspects of the subject matter disclosed herein.

FIG. 2a illustrates an example of a method for stepping in an n-way interoperative debugger in accordance with aspects of the subject matter disclosed herein. At 202 a new step operation is requested by a debugger in response to receiving a user request. An object can be created that holds state about the step such as the type of stepping operation (step-in, step out, step over, the location on the call stack for the step, and so on). At 204 the stepping manager is notified of the new step operation. An object can be created that holds state about the step such as the type of stepping operation (step-in, step out, step over, the location on the call stack for the step, and so on). At 206 the stepping manager passes the new step operation notification to each runtime instance. At 208, each notified runtime debugger instance can perform pre-step setup actions. Pre-step setup actions can include but are not limited to initiating catch handler found notifications, setting breakpoints at known runtime debuggee transitions, designating debuggee transitions modules and so on.

At 210 the stepping manager can perform top-level or initial step arbitration, asking each runtime debugger instance in priority order if the debuggee is currently executing within its runtime. A debuggee is currently executing within a runtime debugger when the instruction pointer points to a region of the callstack that belongs to that runtime debugger. At 212 the current controlling runtime debugger is selected. At 214 the stepping manager notifies all the other runtime debuggers of the new controlling runtime debugger (current controlling runtime). Notification enables the other runtimes to perform special processing for the particular runtime acting as the current controlling runtime. At 216 the current controlling runtime debugger begins to step the process. At 218 at each call instruction that is encountered during the step or anytime the current stack frame changes, the current controlling runtime debugger checks to see if the instruction pointer has landed within a transition module owned by another runtime debugger. Alternatively, another runtime debugger may detect a transition into its runtime when a breakpoint is hit or when another debug event occurs.

At 218 in response to determining that no transition is possible, processing continues at 224 where the step is completed by the controlling runtime debugger. When the stepping operation completes at 224, the current controlling runtime debugger notifies the stepping manager that the step is complete at 226. At 228 the stepping manger notifies all the other runtime debuggers that the step is done. At 230 the debugger user interface receives the step complete notification and enters break mode. If however, at 218 it is determined that a transition is possible, stepping arbitration is requested and processing returns to 220. During step arbitration, the stepping manager asks each runtime debugger in priority order if the runtime claims the location. If no other runtime debugger claims the location, the current controlling runtime debugger finishes the step at 224. If however at 222 the stepping manager determines that a runtime transition has occurred, processing continues at 214.

A runtime debugger instance may also detect transitions into its runtime directly using breakpoints, exceptions, or another debug event. If a transition occurs, the runtime debugger instance can ask the current controlling runtime debugger for control through the stepping manager. If the current controlling runtime debugger instance agrees, step control is given to the new runtime debugger instance. The other runtime debugger instances can be notified of the change in the controlling runtime debugger. All stepping operations including step-in, step over and step-out are enabled by this mechanism. It will be appreciated that a step over may encounter a new boundary module (e.g., if, for example, the step steps off the end of a function). Similarly, a new boundary module can be encountered when the current frame is stepped out from.

Inspection in a debugger is based on callstack frames. In n-way interoperative debugging, each runtime debugger instance is responsible for unwinding its own call stack frames. Each runtime debugger of the n-way interoperative debugger can mark the current frame as its own so that variable inspection can be routed to the appropriate runtime debugger instance. The n-way interoperative architecture can provide a way for frames from different runtime debuggers to be stitched back together after the full call stack is complete. It also must provide a way for "runtime glue" frames to be hidden from the user.

Figure 2B:
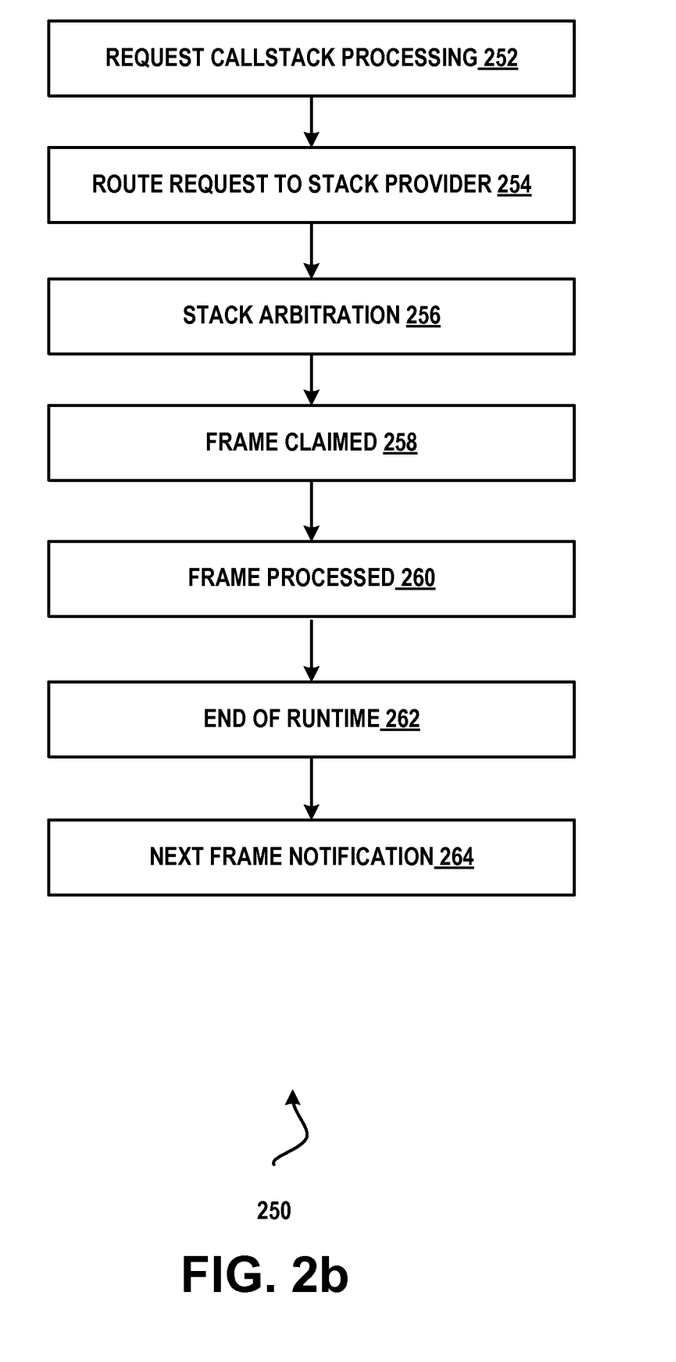
FIG. 2b illustrates an example of a method of walking a callstack 250 in accordance with aspects of the subject matter disclosed herein.

FIG. 2b illustrates an example of a method 250 of walking a callstack in accordance with aspects of the subject matter disclosed herein. At 252, a callstack window can request the n-way interoperative debugger to begin walking frames. At 254, the request can be routed to the stack provider. At 256 the stack provider can, in priority order, ask each runtime debugger instance if it owns the current location. It will be appreciated that each frame is a native frame regardless of the runtime debugger to which it belongs. Because, as in stepping, one runtime debugger can be built on another runtime debugger, the prioritization of runtimes ensures that the proper runtime debugger controls the walking of the callstack. It will be appreciated that while a runtime may be built on a native runtime, it is also possible to build a runtime on a higher level runtime such as for example, exists, when an interpreter is implemented in managed code.

At 258 a runtime debugger claims the location and at 260 requests frames from the callstack until the current frame does not belong to the runtime debugger. At 262 in response to detecting a frame that does not belong to the runtime an "end of runtime" value is indicated to the stack provider. At 264 the runtime notifies the stack provider of the position in the callstack at which the runtime's code starts again (if it does). This prevents another runtime from unwinding a portion of the callstack that does not belong to it. To understand how this could happen, suppose a stack provider is not informed of stack transition points. Suppose a managed unwinder stops at a managed to native transition point. The native runtime will continue unwinding the callstack until the entire stack has been processed even if there is another transition point back to managed code. This happens because all code is ultimately native code.

Similarly, a transition from managed code to interpreted code could be unwound by a managed runtime debugger because the interpreter is implemented in managed code, even though the stack should by unwound by the interpreter. In contrast, in accordance with aspects of the subject matter disclosed herein, because the stack provider knows each transition point, the stack provider can ask each runtime debugger in priority order if the runtime debugger would like to process the next call stack frame. When a runtime debugger claims a frame, the claiming runtime debugger is given control of the unwind. Once all frames have been unwound, call stack frames are filtered. That is, each runtime debugger is given the opportunity to hide runtime glue code or to completely change the contents of a frame. Finally, each frame in the call stack is formatted by the language expression evaluator that matches the frame the in question.

Figure 2C:
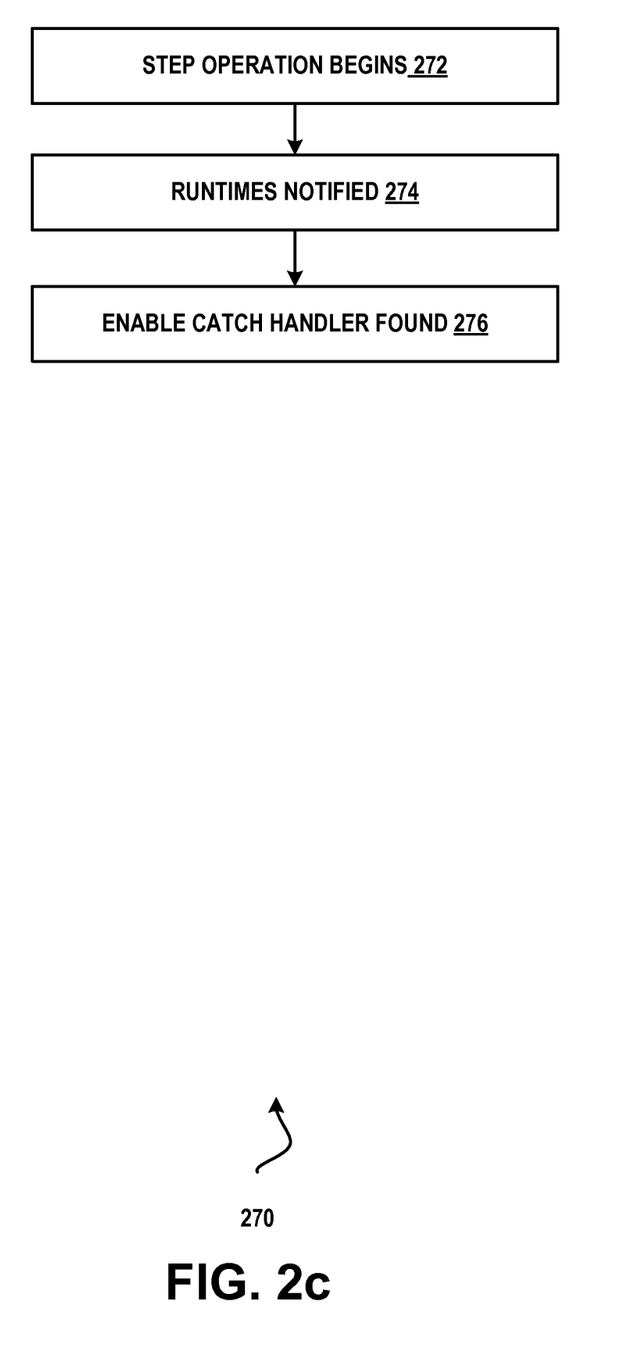
FIG. 2c illustrates an example of a method of handling exceptions 270 in accordance with aspects of the subject matter disclosed herein.

When interoperative debugging is performed, an exception thrown in one runtime debugger can be caught in a catch handler in code running on another runtime debugger. If a step operation is occurring when an exception is thrown, the step is usually stopped. A runtime debugger that supports exceptions can be told when an exception is caught by its runtime debugger using the runtime debugger's exception handler found notification. FIG. 2c illustrates an example of a method 270 for handling exceptions in accordance with aspects of the subject matter disclosed herein. At 272 a step operation begins. At 274, in response, the stepping manager notifies all runtime debuggers that the step operation has begun. At 276 in response to the notification each runtime debugger instance can enable its catch handler found notifications. An exception may be thrown by a frame called from the current stepping frame and can be caught by a frame before the unwind has passed through the stepping frame. In accordance with aspects of the subject matter disclosed herein, the Frame Base of the frame can be used to detect such an instance. The frame base is the value of the stack pointer before any stack operations occur for the frame. In an n-way interoperative debug system in which the callstack grows in a downward direction, a call higher on the callstack will have lower frame base than a call lower on the callstack. That is, if function a calls function b, which itself calls function c, then the callstack will appear as:

c
b
a

C's frame base will be lower than b's frame base which will be lower than a's frame base.

If the catch handler found notification of a runtime fires before a step is complete, the runtime debugger can compare the current stack frame's frame base with the frame base of the stack frame at the time the step was started. If the current stack frame's frame base is lower than the starting frame's frame base, then the exception was thrown and caught by a frame called by the frame for the current step and can be ignored. However, if the frame base is greater than or equal to the frame base at the time of the step, then the exception has transitioned past the point of the step and the step operation can be considered complete. It will be appreciated that some runtimes, including but not limited to CLR, use another runtime's exception model to implement exceptions. Typically managed exceptions are built on native exceptions but other possibilities exist. Any runtime that uses another runtime's exception model can initiate stepping arbitration after the step handler found notification is fired. For example, assume function A (running on the CLR) calls function B (native code). If function B throws an exception, both native and managed runtime instances will receive their handler found notifications (possibly at different times). However, because the target handler is actually managed code, the native runtime instance should allow the managed runtime to finish the step. Logically, the implementation of this looks like this in the CLR:

```
Try
{
  Call NativeCode
}
Catch (native filter)
{
  Call managed catch handler
}
```

If, when stepping over the native code, an exception is thrown, the runtime instance can be sent a catch handler found notification at the native catch block. Step arbitration can be performed whenever catch handler found notification fires. If the location is not claimed, the catch block is in native code and the step is complete. If another runtime debugger claims the location, the claiming runtime debugger can finish stepping. It will be appreciated that the mechanisms described herein in the context of an n-way interoperative debugger can also be applied to a general extensibility model for stepping in a debugger. For example, step arbitration and transition modules can be used by a technology to change the debugging behavior when that technology is being used in a debuggee. For example, COM RPC stepping can invoke a plug-in component that can detect an RPC transition and can cause an in-flight step operation to stop at the target of an RPC call.

Example of a Suitable Computing Environment

Figure 3:
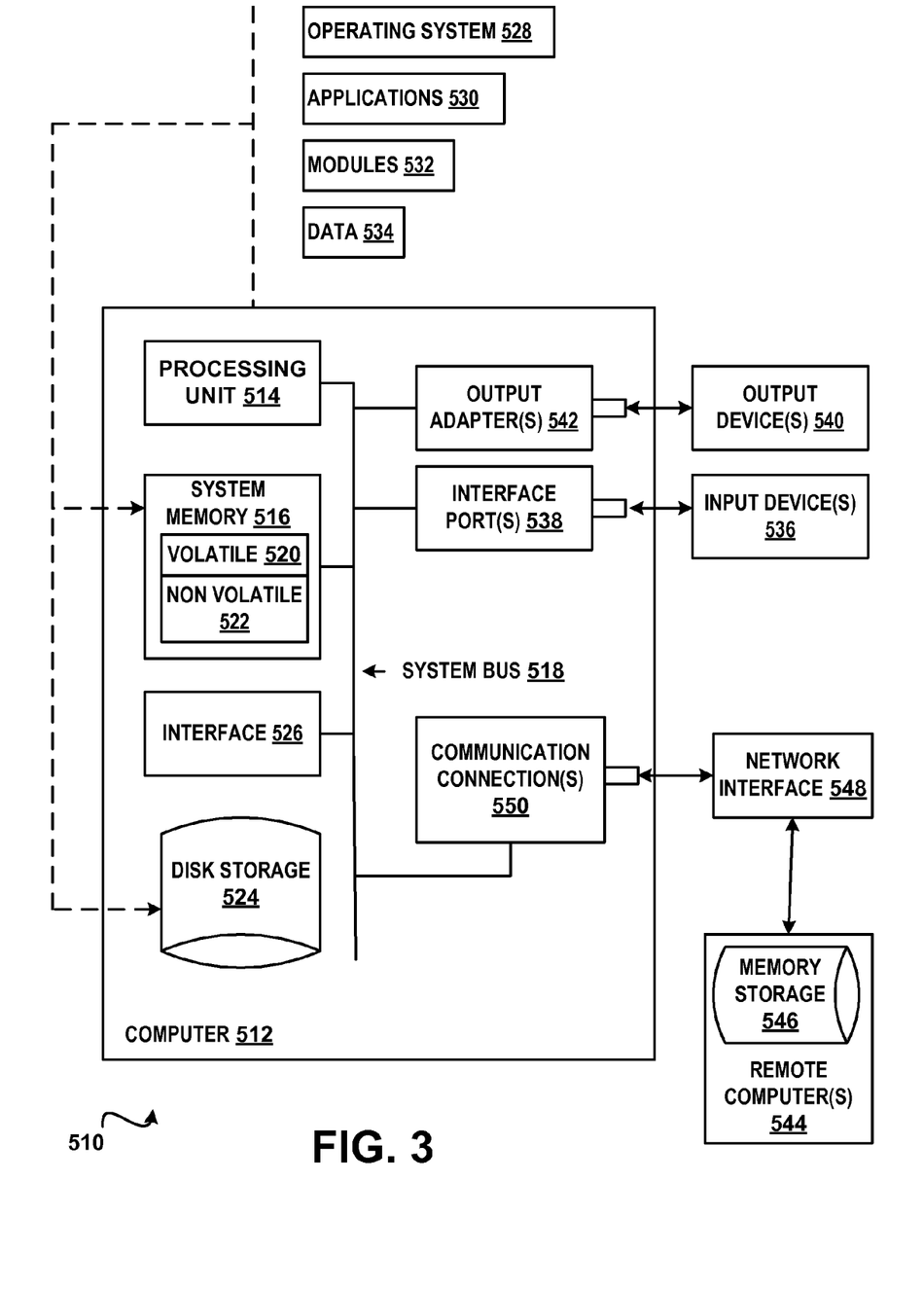
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
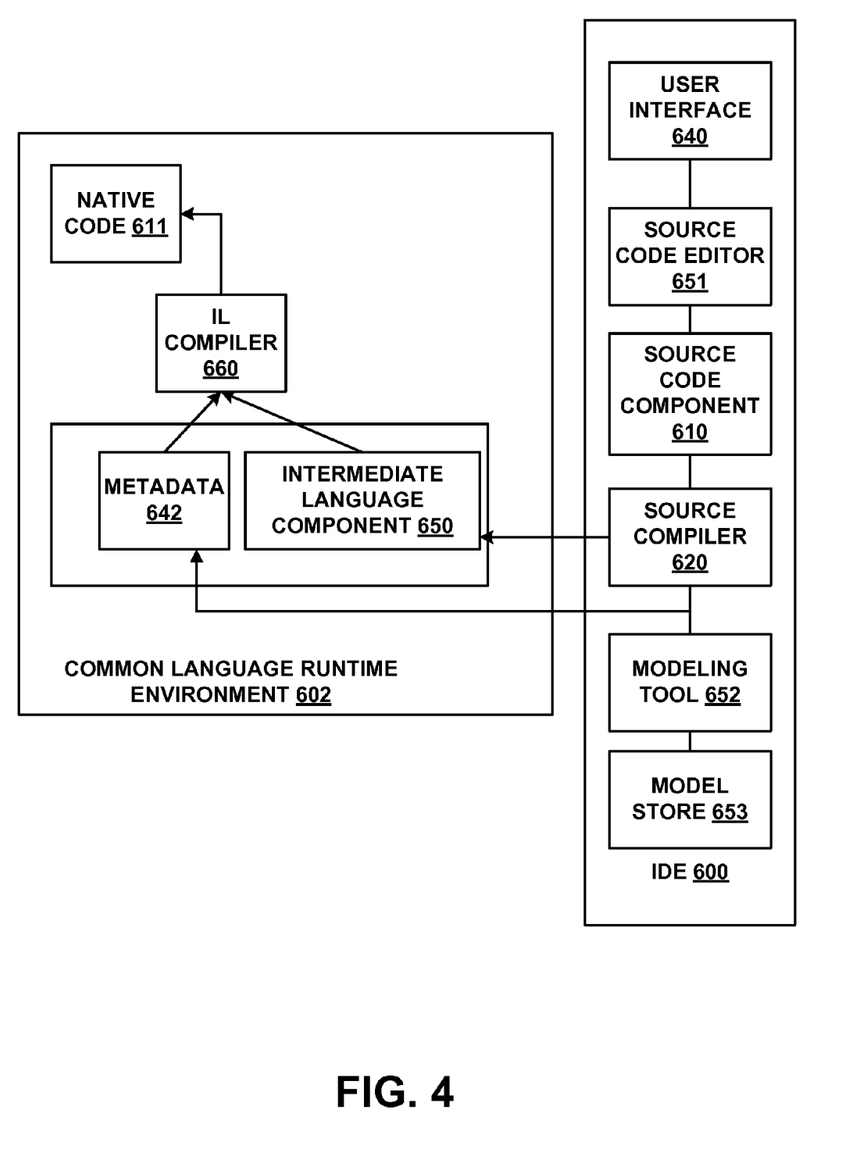
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   a processor and a memory of a computing device; and
   an n-way interoperative debugger comprising a plurality of modules configured to cause the processor of the computing device to interoperatively debug a plurality of n-way interoperative debugger compatible runtime debuggees executing in a single debuggee process, the n-way interoperative debugger providing a holistic view of the single debuggee process, the n-way interoperative debugger comprising:
   a stepping manager module comprising a communication channel for the plurality of runtime debuggees, the stepping manager module performing top-level step arbitration comprising:
      contacting in priority order at least one of the plurality of runtime debuggees;
      receiving a response from a contacted runtime debuggee of the plurality of runtime debuggees claiming ownership of a current debug instruction, the claiming runtime debuggee comprising a current controlling runtime;
      notifying the plurality of runtime debuggees of the current controlling runtime; and a debug monitor module that routes the debug events to a corresponding runtime runtime debugger based on the between the n-way interoperative debugger and the plurality of runtime debuggees to a common protocol.

2. The system of claim 1, wherein the stepping manager module selects a current controlling runtime for the debug operation by:
   contacting in priority order at least one of the plurality of runtime debuggees;
   receiving a response from a contacted runtime debuggee of the plurality of runtime debuggees claiming ownership of a current debug instruction, the claiming runtime debuggee comprising a current controlling runtime; and
   notifying the plurality of runtime debuggees of the current controlling runtime.

3. The system of claim 1, wherein at least one of the plurality of runtime debuggees is a virtual machine runtime debuggee.

4. The system of claim 1, wherein one of the plurality of runtime debuggees is an interpreted runtime debuggee.

5. The system of claim 1, wherein one of the plurality of runtime debuggees is a native runtime debuggee.

6. The system of claim 1, wherein no debugging code is executed in the plurality of runtime debuggees.

7. The system of claim 1, wherein debug operations comprise:
   stepping a debuggee code running from one runtime debuggee to another debugging runtime;
   setting breakpoints in a plurality of runtime debuggees;
   inspecting values from a plurality of runtime debuggees;
   executing callstacks comprising code from the plurality of runtime debuggees.

8. A method comprising:
   receiving by an n-way interoperative debug module executing on a processor, a debug communication from one of a plurality of runtime debuggees executing in a single debug process, the debug communication conforming to a protocol shared by the plurality of runtime debuggees, wherein the plurality of runtime debuggees comprise runtimes that do not execute debug code, detect transitions from one runtime debuggee to another runtime debuggee and detect exceptions thrown in other debugee runtimes;
   determining a current controlling runtime, comprising a runtime debuggee of the plurality of runtime debuggees by contacting in priority order at least one of the plurality of runtime debuggees; and
   notifying at least one of the plurality of runtime debuggees of the determined current controlling runtime.

9. The method of claim 8, wherein at least one of the runtime debuggees comprises a virtual machine runtime.

10. The method of claim 8, wherein one of the runtime debuggees comprises an interpreter runtime.

11. The method of claim 8, wherein one of the runtime debuggees comprises a native runtime.

12. The method of claim 8, wherein an exception thrown in one runtime debuggee is caught in another runtime debuggee in the plurality of runtimes.

13. The method of claim 8, wherein a callstack of the single process comprises frames from the plurality of runtime debuggees.

14. The method of claim 8, wherein transitions between runtime debuggees are detected.

15. A computer-readable storage medium comprising computer-executable instructions which when executed cause at least one processor of a computing device to:
   receive by an n-way interoperative debug module executing on the at least one processor, a debug communication from one of a plurality of runtime debuggees executing in a single debugee process, the debug communication conforming to a protocol shared by the plurality of runtime debuggees, wherein the plurality of runtime debuggees comprise runtimes that do not execute debug code, that detect transitions from one runtime debuggee to another runtime debuggee and that detect exceptions thrown in other debugee runtimes;
   determine a current controlling runtime, comprising a runtime debuggee of the plurality of runtime debuggees, by contacting in priority order at least one of the plurality of runtime debuggees; and
   notify at least one of the plurality of runtime debuggees of the determined current controlling runtime.

16. The computer-readable storage medium of claim 15, comprising further computer-executable instructions, which when executed cause the at least one processor to:
   receive a debug communication from an interpreter runtime debuggee.

17. The computer-readable storage medium of claim 16, comprising further computer-executable instructions, which when executed cause the at least one processor to:
   receive a debug communication from a native runtime debuggee.

18. The computer-readable storage medium of claim 15, comprising further computer-executable instructions, which when executed cause the at least one processor to:
   receive a debug communication from a virtual machine runtime debuggee.

19. The computer-readable storage medium of claim 15, comprising further computer-executable instructions, which when executed cause at least one processor to:
   walk a callstack of the single process, wherein the callstack comprises frames from the plurality of runtime debuggees.

20. The computer-readable storage medium of claim 16, comprising further computer-executable instructions, which when executed cause at least one processor to:
   detect a transition between one of the plurality of runtime debuggees and another of the plurality of runtime debuggees.

* * * * *